United States Patent [19]

Wojcik

[11] 4,062,086

[45] Dec. 13, 1977

[54] SEALLESS STRAP END ALIGNMENT AND CONNECTION MEANS

[75] Inventor: Edward P. Wojcik, Niles, Ill.

[73] Assignee: Signode Corporation, Glenview, Ill.

[21] Appl. No.: 680,165

[22] Filed: Apr. 26, 1976

[51] Int. Cl.² .............................................. B65D 63/02
[52] U.S. Cl. ................................. 24/20 EE; 24/23 EE
[58] Field of Search ............. 24/20 R, 20 EE, 23 EE; 403/375, 393

[56] References Cited

U.S. PATENT DOCUMENTS

| 2,268,339 | 12/1941 | Leslie | 24/20 EE |
| 2,276,988 | 3/1942 | Leslie | 24/20 EE |
| 3,137,047 | 6/1964 | Mosey | 24/20 EE |
| 3,303,541 | 2/1967 | Beach | 24/20 EE |
| 3,426,392 | 2/1969 | Timmerbeil | 24/20 EE |

Primary Examiner—Reinaldo P. Machado
Assistant Examiner—Conrad L. Berman
Attorney, Agent, or Firm—Dressler, Goldsmith, Clement, Gordon & Shore, Ltd.

[57] ABSTRACT

Overlapping ends of metal strap, or the like, are aligned and connected without the aid of an overlying supplemental seal or fastener by means of an array of longitudinally spaced joints which form a one-way interlocking relationship. The joints comprise juxtaposed protuberances formed by slits in the strap ends, integral with the overlapping strap segments, which override each other as the interlocking relationship is formed. Protuberances at each end of the array on one of the strap ends are angled laterally in opposite directions and have a greater width than that of the remaining protuberances which, upon shifting of the joined overlapping lengths of metal strap relative to each other in a direction tending to disengage the joints, wedge in the corresponding slits of the other strap to provide a stop preventing disengagement.

6 Claims, 6 Drawing Figures

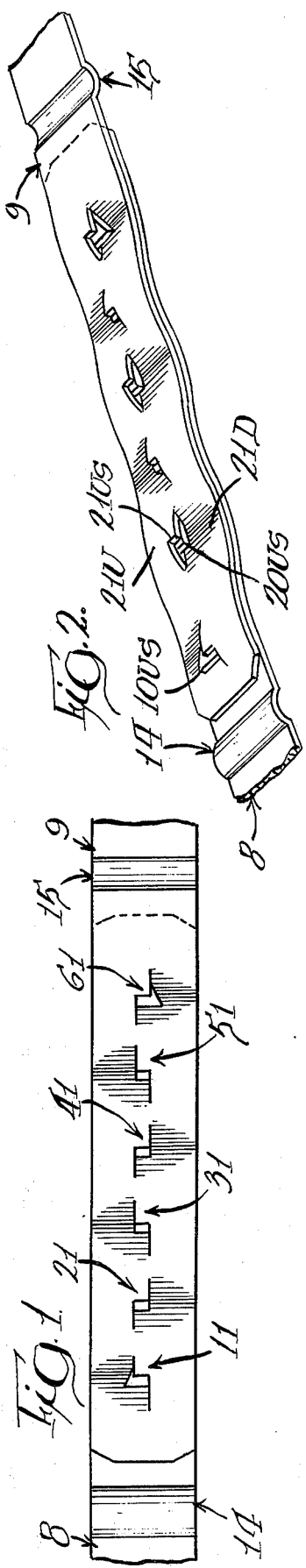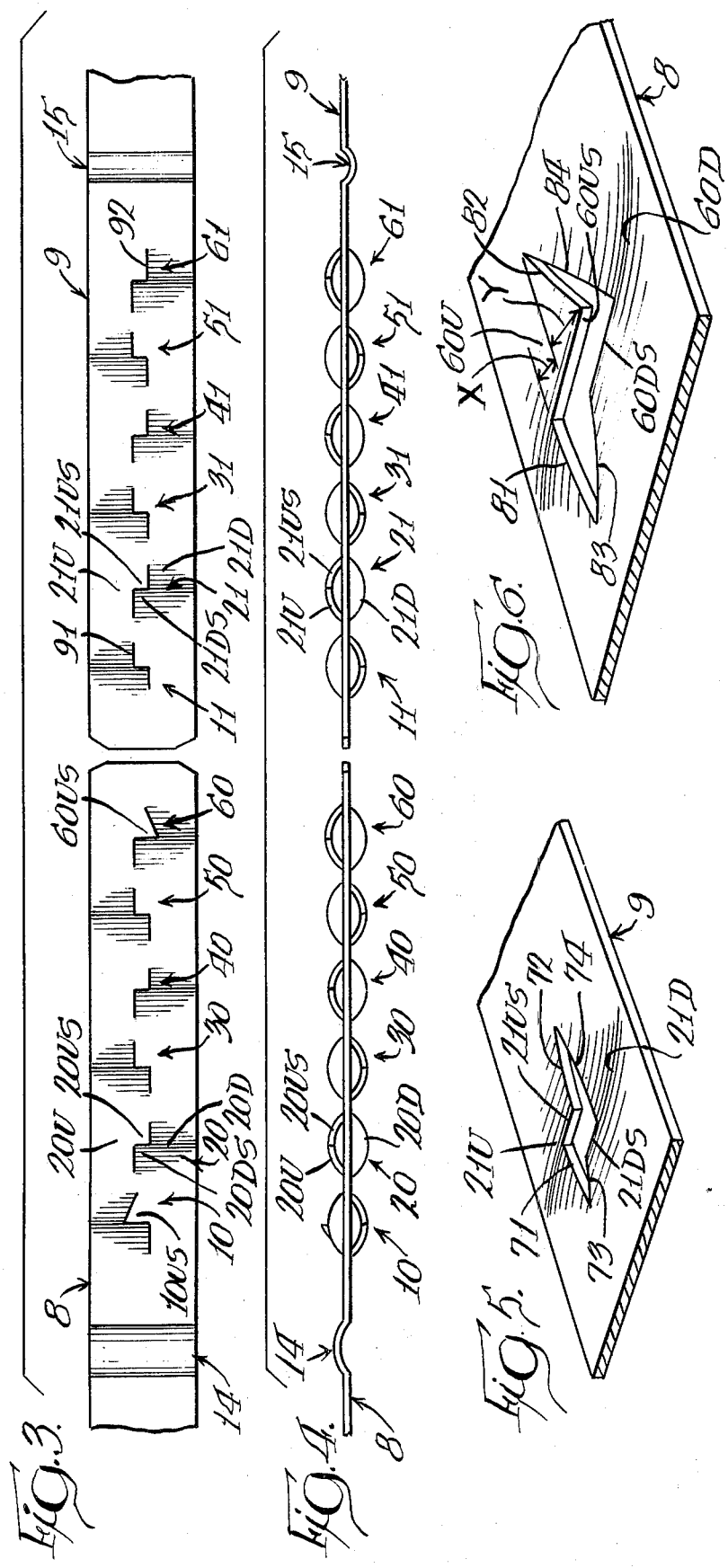

SEALLESS STRAP END ALIGNMENT AND CONNECTION MEANS

BACKGROUND OF THE INVENTION

This invention relates to sealless joints or splices in strap made of relatively stiff sheet material, i.e., metal strap and the like.

It is known to provide sealless connections between strap ends in the form of an array of longitudinally spaced joints. A very common form of such a joint utilizes a central tongue provided with lateral wing extensions partly along the opposite edges of the tongue. However, the load handling strength of such a connection is reduced because the width of the wing extensions reduces the effective cross section of the strap.

Variations of the aforementioned double wing tongue joint have been suggested over the years. Representative prior art patents in this particular field of art are U.S. Pat. No. 180,910 to Olmsted, U.S. Pat. No. 1,606,331 to Anderson, U.S. Pat. No. 2,268,339 and No. 2,276,988 to Leslie, U.S. Pat. No. 3,137,047 to Mosey, U.S. Pat. No. 3,177,538 to Timmerbeil, and U.S. Pat. No. 3,188,706 to Partridge. Yet in all of the foregoing variations, the effective cross-sectional area of the strap is considerably reduced at the connection, thereby reducing the tensile strength of the connected strap. A sealless connection wherein a relatively higher strength at the connection is realized and lateral pull out action is avoided or minimized is taught in U.S. Pat. No. 3,303,541 to Beach.

In all but one of the aforesaid instances the connection is maintained only while the joined overlapping ends are kept under tension. When tension is temporarily released on the connection, or when the overlapping strap ends are longitudinally shifted relative to each other as someone bumps against the strap connections formed around a temporarily compressed bundle of material which is in the process of being strapped, i.e., a bale of cotton or the like, the connections will release and the joined strap ends will again separate.

In the aforementioned U.S. Pat. No. 3,188,706 to Partridge there is disclosed a means to lock a produced one way tension connection by embossing internested dimples in the overlapped connected strap segments. However, a special tool is required for this purpose, thus the proposed locking means is cumbersome to use. Where a large number of workers perform strapping operations at about the same time, a sizeable investment in special tools must be made. Moreover, unless the embossing is done with care, camming surfaces are formed around the periphery of the embossments which camming surfaces tend to spread the internested dimples apart when the strap segments are subjected to a lengthwise force, i.e., by dropping or subsequent compression of a tied bundle. This action by the camming surfaces will tend to defeat the desired locking action when the lengthwise force is a compressive force, and may promote tearing of the interlocking joints in instances where the connected strap is overtensioned. The fastenerless splice of U.S. Pat. No. 3,188,706 also is cumbersome to form because a two-step operation is needed, i.e., the joints must first be made to interlock and then the internested dimples have to be formed.

An approach to overcoming the foregoing difficulties is disclosed in U.S. Pat. No. 3,935,616 to Larry J. Simmons wherein selected juxtaposed protuberances override each other to present face-to-face abutments when the strap ends are shifted relative to each other in an interlock disengaging direction.

The present invention, on the other hand, contemplates a sealless strap connection having an integral locking and anti-disengagement means which obviates the aforementioned drawbacks and which does not require any tools for affixation.

SUMMARY OF THE INVENTION

The present invention contemplates an array of longitudinally spaced joints, formed by overlapping strap segments and connecting a pair of strap ends against pullout, in combination with, a pair of such joints retaining the longitudinally spaced joints in an interlocking position once the joints are formed.

Each joint comprises lengthwise protuberances presenting opposed overlapping shoulders which are displaced from the respective planes of the overlapped strap length or segments. The opposed shoulders are defined by a pair of juxtaposed, staggered slits in the overlapping strap segments and are shaped so as to interlock with each other. The shoulders at both ends of the array thereof in one of the strap ends are of greater lateral dimension than the remaining shoulders so as to irreversibly engage in the corresponding slits in the other strap end and provide a stop therewith when the opposed shoulders are moved toward interlocking disengagement, and thereby retain the other joint-forming opposed shoulders interlocked with each other.

In a preferred embodiment, for each joint each transverse section of each of the overlapping strap segments forming the sealless connection is provided with a single staggered slit defined and flanked by complementary integral strap web portions that are offset in opposite directions normal to the plane of the strap segments. The strap web portions form opposed shoulders so that juxtaposed strap web portions on one strap segment provide lengthwise aligned shoulders matched to corresponding shoulders on the other strap segment. In overlapping strap segments, the inner opposed shoulders of each strap web portion interlock along the staggered slits when the overlapping strap segments are shifted longitudinally.

The shoulders at both ends of the sequence or array thereof on one of the strap ends, however, are laterally larger than the remainder so that when the overlapping strap segments are shifted longitudinally in a direction tending to disengage the interlocked shoulders, the laterally larger shoulders will engage as stops in the slits forming the shoulders with which they are engaged. Joint-forming arrangements embodying the present invention also provide for faster, surer and easier joining in that the larger shoulders may act as a hook means for the end slit in the other strap end thereby providing a starting joint about which the strap ends may be pivoted into alignment for relative longitudinal movement and interlocking of all of the joint-forming shoulders. When so joining such strap ends, the slit at the end of one strap end may be engaged or hooked onto the enlarged shoulder; then the strap ends are rotated until the other enlarged shoulder engages a slit, thereby providing precise alignment of the two strap ends; and finally relatively longitudinally moving the strap ends to fully interlock all of the joint-forming shoulders.

Numerous other advantages and features of the present invention will become readily apparent from the following detailed description of the invention and of one embodiment thereof, from the claims and from the accompanying drawings in which each and every detail shown is fully and completely disclosed as a part of this specification.

BRIEF DESCRIPTION OF THE DRAWINGS

In the accompanying drawings which illustrate embodiments of the present invention, FIG. 1 is a fragmentary plan view of overlapping lengths of strap nested in full registry and longitudinally offset into an interlocking relationship;

FIG. 2 is a fragmentary perspective view of portions of the strap lengths pictured in FIG. 1 and showing the same interlocked;

FIG. 3 is an enlarged fragmentary plan view of the fabricated strap ends of FIG. 1;

FIG. 4 is a side elevational view of the strap ends pictured in FIG. 3;

FIG. 5 is a fragmentary perspective view of the joint element protuberance comprising slit-formed shoulders defined by slit number 21 in FIG. 3; and FIG. 6 is a fragmentary perspective view of the protuberance comprising a slit-formed anti-disengagement shoulder defined by slit number 60 in FIG. 3.

DESCRIPTION OF THE PREFERRED EMBODIMENTS

While this invention is susceptible of embodiment in many different forms, there is shown in the drawings and will herein be described in detail one specific embodiment, with the understanding that the present disclosure is to be considered as an exemplification of the principles of the invention and is not limited to the embodiment illustrated. The scope of the invention will be pointed out in the appended claims.

Referring now to the drawings, lower and upper overlapped lengths or segments of metal strap 8 and 9, respectively, are shown for tension transmitting interengagement by means of a sealless strap connection defined therebetween. Sealless strap connections usually include a tandem array of longitudinally spaced shear lock joints, six of which are shown in FIG. 1 and FIG. 2 with the single joint on each end being formed differently to provide an integral anti-disengagement means. The particular sections of strap which overlap and interlock to make up each joint are configured to nest substantially fully to enable the overlapping strap lengths 8 and 9 to engage in substantially full surface contact. In a six-joint connection array, each strap length has six such nestable sections. Integral anti-disengagement means are positioned at each end of strap 8 and are formed by a slit on each end of the strap 8.

A full strap can be manufactured from a continuous strip with pre-notched severance points between the sets of preformed shear lock joint arrays. When a strap is to be secured around a package, bulk material, or the like, the strap is cut at the notches and strap ends 8 and 9 are placed around the package. The package is temporarily under compression while the strap ends are placed in the overlapped locking configuration shown in FIG. 1 and FIG. 2. If desired, transverse indentations 14 and 15 can be provided in strap segments 8 and 9, respectively, to assist in properly locating these segments when the sealless connection is about to be formed. As shown in FIG. 3 and FIG. 4, indentation 14 is convex and indentation 15 is concave (when viewed from the top in FIG. 3); however, any other arrangement of these indentations may be utilized as a locating aid.

Each of the nestable strap sections of the upper strap 9, as shown in FIGS. 3 and 4, is characterized by lengthwise directed staggered slits 11, 21, 31, 41, 51 and 61 defined and flanked by corresponding complementary pairs of strap web portions, such as 21U–21D on either side of slit 21, that integrally merge endwise with full body regions of the strap and that are offset in opposite normal directions from the plane of the strap. On one side of each slit, the web portion is offset upwardly to form a protuberance and on the other side, the web is offset downwardly to form a protuberance. Each offset web portion presents a shoulder. For example, the shoulder of web portion 21U is shown in FIGS. 2, 3 and 4 and is designated 21US.

FIG. 5 shows in more detail the configuration of a staggered slit and, in particular, the slit 21 of FIGS. 2 and 3. In FIG. 5, shoulder 21US is shown in the upwardly offset web portion 21U above the plane of the strap 9. The face of shoulder 21US is in the "jog region" of the slit and runs perpendicular to the side edge of the strap end 9. Lengthwise regions 71 and 72, parallel to the side edges of the strap end 9, define the ends of the face of shoulder 21US and separate the upwardly offset web portion 21U from the downwardly offset web portion 21D. Lengthwise regions 73 and 74 are parallel to the side edges of strap web 9 and define the edges of downwardly offset web portion 21D. In the lateral "jog region" between the lengthwise regions 73 and 74 is shoulder 21DS. The face of shoulder 21DS is perpendicular to the side edges of strap 9 and is aligned parallel to the face upper shoulder 21US.

The configuration of joint slits 41 and 61 is substantially identical to joint slit 21 described above. The balance of the slits of the upper strap 9, slits 11, 31, and 51, are reversed, compared to slits 21, 41 and 61, as can be seen in FIG. 3. These slits have substantially the same configuration as shown in FIG. 5, except as necessarily modified (reversed) with respect to orientation.

Like upper strap 9 described above, each of the nestable strap sections of the lower strap 8, with the notable exception of sections containing special slits 10 and 60 in FIG. 3, is characterized by a substantially identical lengthwise directed slit defining and flanked by complementing strap web portions presenting shoulders that are normal to the plane of the strap.

In particular, for example, the nestable strap section of lower strap 8 containing slit 20 corresponds to the nestable secion containing slit 21 of upper strap 9 as shown in FIG. 3. Slit 20 is defined and flanked by a complementary pair of strap web portions 20U and 20D that integrally merge endwise with the full body regions of the strap 8 and that are offset in opposite normal directions from the plane of the strap. Web portion 20U is offset upwardly and web portion 20D is offset downwardly, thereby presenting shoulders 20US and 20DS, respectively.

The configuration of slit 40 of lower strap 8 is substantially identical to slit 20 described above. The nestable strap sections of the lower strap 8 containing slits 30 and 50 are characterized by a substantially identical, but reversed, lengthwise directed slit defining and flanked by complementary strap web portions presenting shoulders that are normal to the plane of the strap. The two remaining slits 10 and 60 function additionally to prevent disengagement and will be described later.

A joint of slits 20, 30, 40 and 50 coacting, respectively, with slits 21, 31, 41 and 51 will now be described. For this purpose, the interlocking of just one pair of slits of the array will be described since the interlocking of the other slit pairs is analogous. Consider slit 20 of strap segment 8 and corresponding slit 21 of strap segment 9. When strap lengths 8 and 9 are superimposed in full registry, as shown in FIG. 1, the corresponding staggered slits of the array, including, in particular, slits 20 and 21, are in juxtaposition and in contact with each other. In this position, and considering the completed joint shown in FIG. 2, the undersurface of shoulder 21US of upper strap 9 rests on the upper surface of the shoulder 20US of lower strap 8. Similarly, the lower surface of the shoulder 21DS of upper strap 9 rests on the upper surface of shoulder 20DS (hidden in FIG. 2) of lower strap 8.

Thereafter, the strap lengths are shifted longitudinally, as shown in FIG. 2, —strap 8 to the left and strap 9 to the right— to effect a one-way mutual interlocking relationship between the shoulders 21DS and 20US as shoulder 20US slides over shoulder 21DS. Shoulder 20US of strap 8 wedges between the opposed slanting surfaces of web portions 21U and 21D of strap 9 (FIGS. 2 and 3). Shoulder 21DS of strap 9 wedges between the opposed slanting surfaces of web portions 20U and 20D of strap 8. The wedging action prevents further movement of strap 8 to the left and strap 9 to the right, thereby locking the strap ends together.

Thus, it is seen in the completed point that shoulders 20US and 21DS are the pair of interlocking shoulders and shoulders 20DS and 21US are the non-interlocking shoulders. In each pair of interlocked slits of a joint, the two inner shoulders (one from each strap end) are the interlocking shoulders and the two outer shoulders (one from each strap end) are the non-interlocking shoulders.

In addition to forming part of the interlocking joint, the two special slits of the array of lower strap 8 function to prevent disengagement of the interlocked straps. In FIG. 3, the slits 10 and 60 on each end of the array are formed differently than the remaining slits on lower strap 8 or upper strap 9. These two slits have an anti-disengagement protuberance comprising a shoulder having a side depending at an angle from the face of the shoulder. The two shoulders extend in opposite directions relative to each other. Each shoulder has a greater width than that of the shoulders in the array. The shape of these laterally angled shoulders is shown in FIG. 6 which represents an enlarged perspective view of slits 60 of FIG. 3.

In FIG. 6, downwardly offset web portion 60D projects below the plane of lower strap 8 forming a protuberance with shoulder 60. An upwardly offset web portion 60U protrudes above the plane of lower strap 8 forming a protuberance with shoulder 60US which runs perpendicular to the edge of strap 8. The side of the shoulder is defined by lengthwise region 82 which is angled with respect to the edges of strap 8 so as to form shoulder 60US wider at the face of the shoulder between lengthwise regions 82 and 81 than at the root of the shoulder region at the convergence of lengthwise regions 82 and 84.

Note that the lengthwise region 82 forming the side of shoulder 60US is laterally angled such that the width of the region behind the shoulder increases in the direction that the strap is pulled to engage the interlocking joint elements. The greatest width of the region of the shoulder occurs at the shoulder face at the middle of the slit in the lateral jog region of the slit. That is, with reference to FIG. 6, the width of the region behind the shoulder is "X" at its root and is the larger width dimension "X + Y" at its face. Lengthwise regions 81 and 83, which separate the downwardly offset web portion 60D from the plane of lower strap 8 are parallel to the edges of the lower strap 8.

The angle of the anti-disengagement side of shoulder 60US is shown in plan view in FIG. 3. At the other end of the slit array on strap 8 in FIG. 3, the angle of anti-disengagement side of shoulder 10US is shown in the opposite direction. When the strap lengths 8 and 9 are superimposed in full registry and pulled together longitudinally to interlock, the shoulders 10US and 60US of the lower strap 8, wedge between the opposed slanting surfaces of the upper strap length 9 that comprise the web portions at slit 11 and the web portions at slit 61, respectively. If the straps 8 and 9 are accidently pushed together longitudinally, disengagement of the interlocking slots of the joint array is prevented by the angled sides of the shoulders 10US and 60US which then become wedged in slits 11 and 61, respectively, between the upper strap 9 web portions forming slit ends 91 and 92, respectively (FIG. 3). This reverse wedge engagement prevents the straps from being pushed further together and thus prevents the joint from disengaging.

Joint forming arrangements embodying the present invention provide for faster, surer and easier joining in that the larger shoulders of the two anti-disengagement slits may act as a hook means for the end slit in the other strap and thereby provide a starting joint about which the strap ends may be pivoted into alignment for relative longitudinal movement and interlocking of all the joint-forming shoulders.

To make a connection of the two straps and form a completed joint, the upper strap end 9 is placed on top of the lower strap end 8. The slit at either end of the upper strap 9, either slit 11, or slit 61, may be engaged with, or hooked onto, the enlarged shoulder of the corresponding anti-disengagement slit of lower strap 8 (either shoulder 10US or shoulder 60US). Then the strap ends are rotated until the other enlarged shoulder engages the corresponding slit, thereby providing precise alignment of the two strap ends. Finally, the straps are moved longitudinally relative to each other to fully interlock all of the joint-forming shoulders.

The slit orientation is not overly critical. The staggered slits can be centered and aligned, or can be arrayed in a non-centered balanced pattern, as desired. A staggered slit is here said to be centered when the midpoint of the shoulder (lateral jog region) is approximately on the strap centerline. For this condition, the flanking strap web portions are equal in effective cross-section and the forces transmitted by the strap balance out about the fulcrum point established by the interlocking shoulder, thus avoiding strap twisting effect. With the exception of the two disengagement slits, the joint slits can all jog in the same lateral direction, or some of them can jog in an opposite lateral direction.

It should be noted that each of the slits may be provided with a straight companion slit to provide a laterally facing abutment for preventing lateral pull-out movement; however, with the centered, right-angled slit configuration, these companion slits are not required. Such companion slits can be used where the staggered slits are off the strap centerline.

The foregoing description and the drawings are intended as illustrative and are not to be taken as limiting.

Still other variations and/or rearrangements of parts within the spirit and scope of the present invention are possible and will readily present themselves to the skilled artisan.

What is claimed is:

1. A sealless strap connection between overlapped lengths of strap which comprises an array of longitudinally spaced joints, each joint comprising lengthwise protuberances presenting opposed non-interlocking shoulders displaced from the respective planes of said overlapped lengths of strap and lengthwise protuberances presenting opposed interlocking overlapping shoulders displaced from the respective planes of said overlapped lengths of strap shaped to interlock with each other, at least one of said interlocking shoulders of said array on one of said lengths of strap being disposed beneath one of said non-interlocking shoulders of the other length of strap, the face of said one interlocking shoulder having a width greater than that of the face of said one non-interlocking shoulder, said one interlocking shoulder further having a greater lateral extension than said one non-interlocking shoulder, said greater lateral extension being defined by the side of said one interlocking shoulder depending from said face of said one interlocking shoulder at an acute included angle for inhibiting separation and unlocking of said joints.

2. A sealless strap connection in accordance with claim 1 wherein said protuberances are defined by juxtaposed, staggered slits in said overlapping lengths of strap and said side of said one interlocking shoulder of greater lateral extension engages in one of said slits preventing disengagement of the interlocked overlapped shoulders when said overlapped lengths of strap are shifted lengthwise in an interlock disengaging direction.

3. The sealless strap connection in accordance with claim 2 wherein each protuberance is defined by a substantially Z-shaped slit having a substantially transverse central region and said side of said one interlocking shoulder of greater lateral extension engages the portion of said strap defining a leg of one of said slits.

4. A sealless strap connection between overlapped lengths of strap which comprises an array of longitudinally spaced joints, each joint comprising lengthwise protuberances presenting opposed non-interlocking shoulders displaced from the respective planes of said overlapped lengths of strap, each joint further comprising lengthwise protuberances presenting opposed interlocking shoulders displaced from the respective planes of said overlapped lengths of strap and openings in each of said lengths of strap corresponding to said shoulders, said interlocking shoulders shaped to interfit into said openings and interlock with each other, at least one of said interlocking shoulders of said array on one of said lengths of strap being disposed beneath one of said non-interlocking shoulders of the other length of strap, the face of said one interlocking shoulder having a width greater than that of the face of said one non-interlocking shoulder, said one interlocking shoulder further having a greater lateral extension than said one non-interlocking shoulder in said array, said greater lateral extension being defined by the side of said one interlocking shoulder depending from the face of said one interlocking shoulder at an acute included angle to inhibit separation and unlocking of said joints.

5. In a sealless strap connection between overlapped lengths of metal strap, an array of longitudinally spaced shear lock joints, each joint being defined between nestable strap sections provided by matched integral portions of each length of metal strap, said nestable strap sections that define each joint being partly offset longitudinally to engage in one-way mutually interlocking relationship, each said nestable strap section having a single longitudinally oriented staggered slit comprised of lengthwise slit end regions and a lateral jog region joining the slit end regions, each staggered slit defining and being flanked by complementary integral strap web portions offset in opposite normal directions to present a lengthwise interlocking shoulder opposed by a lengthwise non-interlocking shoulder, each of said shoulders bordering the intermediate jog region of the slit, each joint having each of its nestable strap sections presenting said interlocking shoulder nestable within the jog region of the other strap section and enterable endwise into the opposing slit end region of said other section to establish one-way interlocking engagement therebetween, and an integral anti-disengagement means comprising at least one of said interlocking shoulders of said array on one of the strap sections being disposed beneath one of said non-interlocking shoulders of the other strap section, the face of said one interlocking shoulder having a width greater than that of the face of said one non-interlocking shoulder, said one interlocking shoulder further having a greater lateral extension than said one non-interlocking shoulder, said greater lateral extension being defined by the side of said one interlocking shoulder depending from the face of said one interlocking shoulder at an acute included angle to engage a slit end region so that upon shifting of the joined overlapping lengths of metal strap in a direction tending to disengage said interlocking engagement said side of said one interlocking shoulder of greater lateral extension will be engaged by the corresponding slit end region to provide a stop before disengagement occurs.

6. A strap segment adapted for forming a sealless strap connection between overlapped lengths of strap which segment, at each terminal portion of said strap segment, comprises an array of longitudinally spaced joint elements with an integral anti-disengagement means positioned on at least one of said joint elements, each joint element comprising a lengthwise interlocking shoulder displaced from the plane of the strap segment and shaped to interlock with a superposed interlocking shoulder of a superposed joint element of the overlapped strap length, and comprising a non-interlocking shoulder shaped to override said superposed interlocking shoulder of the overlapped strap length while said interlocking shoulder is moved into an interlocking position with said superposed interlocking shoulder of said overlapped strap length, at least one of the superposed interlocking shoulders of the array thereof being angled laterally, the face of said one interlocking shoulder having a width greater than that of the face of said one non-interlocking shoulder, said one interlocking shoulder further having a greater lateral extension than its overriding non-interlocking shoulder, said greater lateral extension being defined by the side of the said shoulder depending from the face of said one superposed interlocking shoulder at an acute included angle to present a stop when said straps interlock with each other and are subsequently relatively longitudinally displaced in a disengaging direction wherein said side of said superposed interlocking shoulder of greater lateral extension protrudes beyond and wedges between its overriding non-interlocking shoulder and an adjacent portion of said strap segment containing said overriding non-interlocking shoulder.

* * * * *